Figure 1:
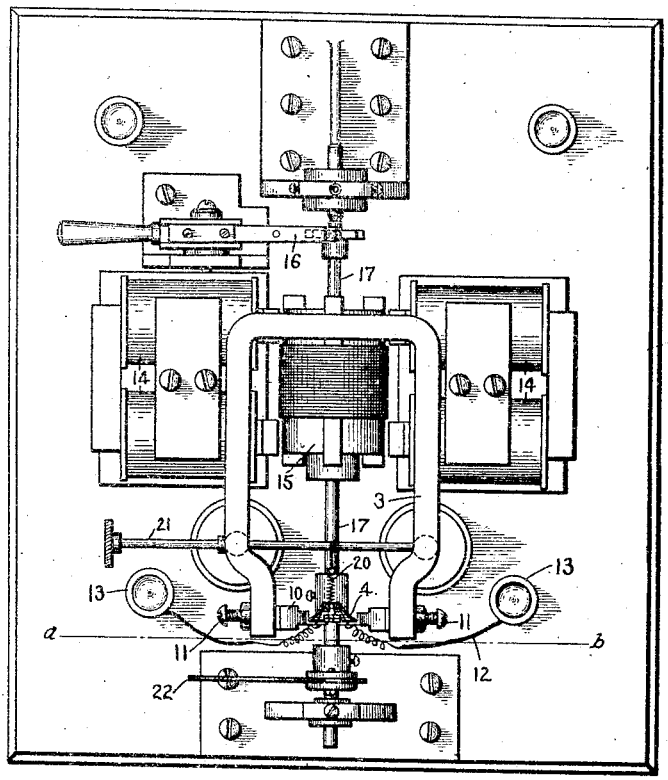

J. T. DEMPSTER.
OSCILLOGRAPH.
APPLICATION FILED FEB. 14, 1908.

919,137.

Patented Apr. 20, 1909.

2 SHEETS—SHEET 1.

WITNESSES:
Irving E. Steers.
J. Ellis Glen

INVENTOR
JOHN T. DEMPSTER.
BY
Albert G. Davis
ATTY.

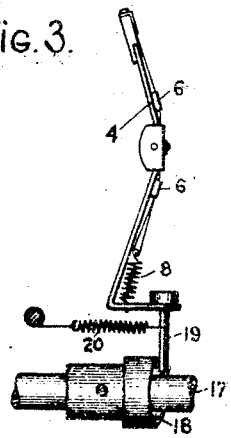
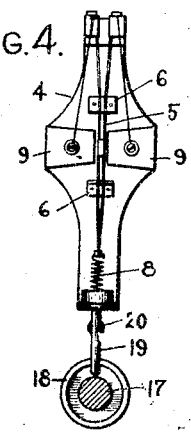
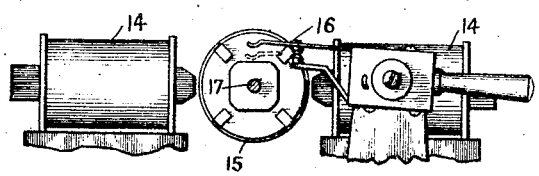
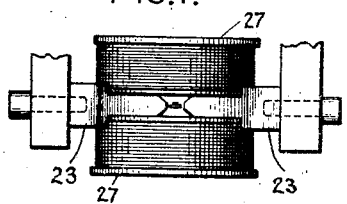
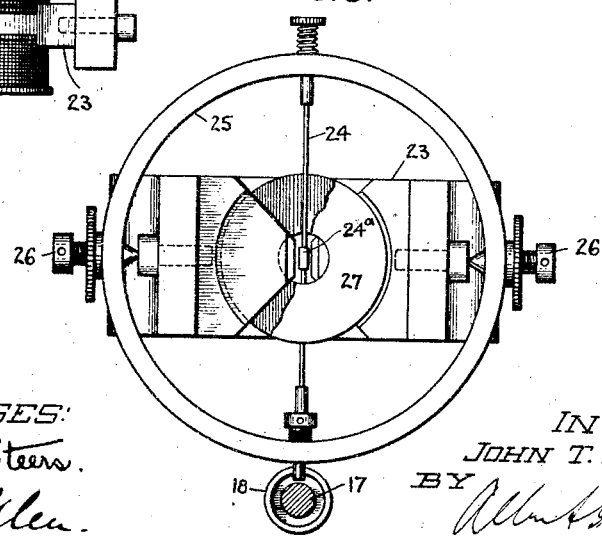

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

OSCILLOGRAPH.

No. 919,137.  Specification of Letters Patent.  Patented April 20, 1909.

Application filed February 14, 1908. Serial No. 415,850.

*To all whom it may concern:*

Be it known that I, JOHN T. DEMPSTER, a subject of the King of Great Britain, residing at Schenectady, in the county of Schenectady, State of New York, have invented certain new and useful Improvements in Oscillographs, of which the following is a specification.

My invention relates to oscillographs and similar instruments for investigating conditions on electric circuits, its object being to simplify and improve the construction of these devices and particularly to provide a simple and rugged device by means of which a current or voltage curve may be projected on a screen or other receiving surface on any desired scale.

The standard oscillograph heretofore used consists essentially of a reflecting galvanometer in which the mirror oscillates about a vertical axis in response to changes in voltage or current on the circuit to which the instrument is connected, and a beam of light reflected from the mirror moves to and fro in a straight horizontal line over a screen or similar receiving surface. If it is desired to trace out a curve of current or voltage, the beam of light from the galvanometer mirror must be reflected to the screen from a second mirror oscillated about an axis at right angles to the axis of the galvanometer mirror and in synchronism with the alternations of current or voltage on the circuit connected to the galvanometer. The curve secured from the standard instrument above described is on a small scale and cannot be projected on a screen before an audience with satisfactory results, and the whole apparatus must be inclosed in a light-tight box when it is used in daylight or in a lighted room.

In carrying out my invention I provide a galvanometer with a movable member, preferably a mirror, mounted so that it can move in one direction in response to variations in voltage or current in the circuit to which it is connected, and also in another direction, preferably at right angles to the first, in synchronism with the periodic changes in current or voltage on that circuit. As a result of the simultaneous movement of the mirror in two directions at right angles to each other, the beam of light reflected from the mirror will trace out upon the screen a curve accurately representing the current or voltage on the circuit to which the instrument is connected, and the scale upon which the curve is traced is determined by the distance of the screen from the instrument. The moving member or mirror of the galvanometer may be mounted in many different ways to secure two movements at an angle to each other, one desirable way being to mount the member to move about two axes at right angles to each other, the movement about one axis varying with either the voltage or current in the circuit to which the galvanometer is connected, while the movement about the other axis is in synchronism with that circuit. In the preferred construction the mirror, connected so as to swing or vibrate in response to current or voltage, is mounted on a support which is pivoted between the poles of a magnet and is vibrated about its pivots by means of some device, such as a synchronous motor, which will give it a motion having a definite time relation to the vibrations of the mirror, which vibrates at a rate dependent on the frequency of the circuit to which the instrument is connected.

My invention will best be understood in connection with the accompanying drawings, which are merely illustrative of some of the many forms in which the invention may be embodied, and in which—

Figure 2:
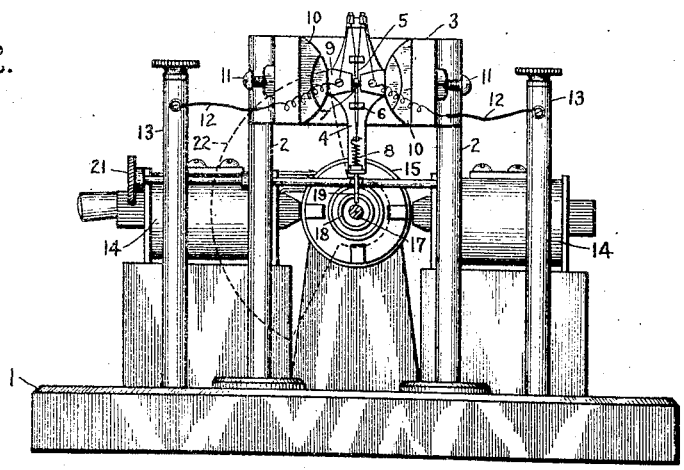

Figure 1 is a plan view of an instrument embodying my invention; Fig. 2 an end view of the instrument shown in Fig. 1 on a section along the line *a b*; Fig. 3 a detail side view of the support for the movable element of the galvanometer; Fig. 4 is another view of the device shown in Fig. 3; Fig. 5 an end view of a synchronous motor showing one form of a starting device; Fig. 6 an end view of a modified form of instrument shown with parts broken away; and Fig. 7 a view looking down upon the instrument shown in Fig. 6, with parts broken away.

The particular form of instrument shown in Fig. 1 is mounted upon a suitable base 1, with pedestals 2 for supporting a magnet 3, which supplies an intense magnetic field for a reflecting galvanometer in which the mirror or similar movable reflecting member is mounted to move in two directions at right angles to each other. The mirror 7 moves in one direction, or vibrates about a vertical axis because it is cemented to a looped conductor 5 connected to the circuit and maintained under tension across bridges 6 on the support 4 by means of a spring 8. The mirror 7 is movable in another direction at right angles to the first because the support 4 is movable at right angles to the axis of movement of the mirror, which is cemented to the conductor between the bridges. The support 4 also carries wedge-shaped iron pole pieces 9 with their inner ends on each side of and parallel to the conductor 5 near the mirror, and the other ends in close sliding engagement with the poles 10 of the magnet 3, so that the pole pieces are part of the magnetic circuit of the magnet, although movable with relation to it. The support 4 carrying the pole pieces 9 may be movably mounted in any suitable way, and is shown mounted upon pivots 11 carried by the magnet 3, so that the support can oscillate about a horizontal axis extending through the pole pieces of the magnet, and since the axis of vibration of the mirror is vertical, the two axes are at right angles to each other and intersect in the plane of the mirror, which is movable about either axis. The pole pieces 9 are in good contact with the poles 10 of the magnet, and conduct the magnetic flux with very little loss, so that an intense primary field is maintained around the conductor in spite of the fact that the pole pieces 9 move with reference to the poles 10 of the magnet. Current is supplied to the looped conductor 5 through flexible leads 12 connected to terminals 13 on the base, and sets up around the looped conductor a secondary field which varies with the flow of current and causes the looped conductor to vibrate about a longitudinal axis in accordance with changes in current, thereby causing the mirror to turn to an extent dependent on the strength of the current, the beam of light from the mirror swinging back and forth in a horizontal line as the current in the conductor varies.

The arrangement described constitutes a galvanometer which is exceedingly sensitive, and in which the vibrations of the mirror 7 about an axis parallel to the conductor vary in amplitude with very slight variations in the current through the conductor. The beam of light from the mirror will trace out upon a screen a curve representing the periodic vibrations of the mirror about its vertical axis, if the support 4 is rocked in any suitable manner about its horizontal axis in some definite time relation to the periodic vibrations of the mirror about its vertical axis. The preferred arrangement for rocking the support in definite time relation to the mirror is shown in the drawings, in which a two-pole synchronous motor, comprising field magnets 14 and an armature 15, is provided with any suitable starting device, such as that shown at 16 comprising a brush which may be brought into engagement with the armature during the period of starting. This synchronous motor has its armature mounted upon a shaft 17 carrying a cam 18 engaged by a pin 19 secured to the support 4 and yieldingly held against the cam by a spring 20 connected to an adjusting device 21 for varying its tension. The cam 18 is so proportioned that one revolution of the shaft 17 causes one complete vibration or oscillation of the support 4 and the rate of vibration of the support depends upon the frequency of the alternating current circuit to which the motor is connected.

The instrument above described will cause a beam of light reflected from the mirror 7 to trace out a curve on the screen, but in order to avoid confusion it is necessary to prevent an indication appearing on the screen during the time the support is returning from its extreme position to its initial position, as otherwise the sine curve of an alternating circuit would appear on the screen in the form of a figure 8. In order to accomplish this result the reflection of the beam of light from the mirror to the screen during a definite part of each vibration of the support 4 is prevented by any suitable device, such as a shutter 22 mounted on the shaft 17 and proportioned to cut off the light from the mirror during nearly a half revolution of the shaft, during which time the support 4 returns to its initial position, whereupon the shutter moves away from in front of the mirror and the beam of light begins to retrace the curve.

This invention may be embodied in galvanometers in which the moving element is constructed in different ways, and in the modification shown in Fig. 6 the magnet 3 is provided with fixed pole pieces 23 suitably shaped and tapered to produce an intense magnetic field between their tips. An iron strip 24 carrying a small mirror 24ᵃ is strung under tension between the pole tips so as to be subject to the magnetic field and is supported in a movable frame 25 mounted to vibrate or oscillate about pivots 26 on the pole pieces of the magnet 3. The frame 25 is oscillated indefinite time relation to the periodic swings of the mirror 24ᵃ by means of the cam 18 in the same manner as the support 4 of the instrument shown in Fig. 1 is oscillated. The iron strip with the small mirror is caused to oscillate about a vertical axis in response to variations of voltage or current by means of two current coils 27 mounted on each side of the pole pieces of the magnet 3 and energized by current derived from the circuit on which the instrument is used, while the supporting frame is oscillated by the synchronous motor about a horizontal axis intersecting the axis of the strip in the plane of the mirror.

The operation of the instrument shown in Fig. 1 is as follows: The terminals 13 and the synchronous motor are connected to the circuit under investigation in such a manner that a current derived from the circuit and in synchronism with either the voltage or current of the circuit flows through the conductor 5, causing the mirror to vibrate about its vertical axis in response to the current through the galvanometer and in synchronism with the circuit, while the synchronous motor, which has been brought up to speed by means of the starting device 16, vibrates or oscillates the support 4 about its horizontal axis at a rate dependent upon the frequency of the circuit, and in definite time relation to the mirror's periodic swings or vibrations, which also depend upon the frequency of the circuit. A beam of light directed on the mirror 7 is reflected back on any suitable screen and traces out upon the screen a curve, of which one dimension varies with the angular position of the support 4, while the other dimension varies with the amount of current through the conductor 5. As the support 4 makes a complete movement in one direction from its initial position the mirror swings through a complete cycle and a sharply defined curve representing the complete cycle is traced out upon the screen. The shutter 22, by cutting off the beam of light from the mirror, prevents any indication on the screen during the movement of the support back to its initial position, and thereby prevents the curve appearing in the form of a loop or figure 8. As soon as the support 4 reaches its initial position the shutter 22 moves from in front of the mirror, and the beam of light retraces the curve, which, owing to the persistence of vision, appears steady and does not flicker if the frequency of the circuit is 25 cycles or greater. The curve may be projected on a screen before an audience upon a scale so large that the curve may be easily seen and studied by every member of the audience, since the scale depends upon the distance of the screen from the instrument, while the curve may be made sharp and easily visible by throwing a very intense light on the mirror.

The operation of the forms shown in Figs. 6 and 7 is the same as that above described, the only difference being that the mirror 24ᵃ mounted on the iron strip swings about its vertical axis in response to current through the current coils 27.

While the principal field of service of the instrument is in taking curves of current or electromotive-force it may, by means which will be readily understood by engineers, be used to take watt curves or any curves of a periodically varying force.

My invention may be embodied in many other forms than that shown and described, and I, therefore, do not wish to be restricted to the exact form shown, but intend to cover by the appended claims all changes and modifications within the spirit and scope of my invention.

What I claim as new and desire to secure by Letters Patent of the United States, is—

1. In an oscillograph, the combination with a galvanometer comprising a magnet for producing a primary magnetic field, a vibratory member which produces a secondary magnetic field and is mounted in said primary field to vibrate about two axes perpendicular to each other, and connections whereby the mutual effect of said primary and said secondary fields is varied in response to variations of current through the galvanometer to cause said member to vibrate about one axis, of means for vibrating said member about the other axis at a rate which bears a definite relation to its rate of vibration about the first axis.

2. In an oscillograph, the combination with a galvanometer comprising a magnetic field, a current carrying conductor mounted in the field of said magnet to vibrate about two axes perpendicular to each other and connections for supplying current to said conductor to cause it to vibrate about one axis in response to variations in current through the galvanometer, of means for vibrating said member about its other axis at a rate which bears a definite relation to its rate of vibration about the first axis.

3. In an oscillograph, the combination with a galvanometer comprising a magnet for producing a primary magnetic field, a support pivoted adjacent said magnet to vibrate about its pivot, a current carrying conductor mounted on said support to extend into said field and to vibrate about a longitudinal axis perpendicular to the pivot of said support, and connections for supplying current to said conductor to cause it to vibrate about its longitudinal axis in response to variations in current through the galvanometer, of means for vibrating said support about its pivot at a rate which bears a definite relation to the rate of vibration of said conductor about its longitudinal axis.

4. In an oscillograph, the combination with a galvanometer comprising a magnet for producing a magnetic field, a support pivoted adjacent said field, a looped current carrying conductor strung on said support to bring both sides of said conductor into said field and to leave said conductor free to vibrate about a longitudinal axis perpendicular to the pivot of said support, a mirror secured to said conductor, and connections for supplying current to said conductor to cause it to vibrate about its longitudinal axis in response to variations in current through the galvanometer, of means for vibrating said support about its pivot in synchronism with the current through the conductor.

5. In an oscillograph, the combination with a galvanometer comprising a field magnet, a member mounted between the poles of said magnet to vibrate about two intersecting axes, and current-responsive means for vibrating said member about one axis, of means for vibrating said member about the other axis at a rate which bears a definite relation to its rate of vibration about the first axis.

6. In an oscillograph, the combination with a field magnet, of a support mounted to vibrate about an axis extending through the poles of said magnet, a member movable in response to current through the oscillograph and mounted on said support to vibrate between the poles of said magnet about an axis intersecting the axis of vibration of said support, and means for vibrating said support in synchronism with said current.

7. In an oscillograph, the combination with a field magnet, of a support mounted to vibrate about an axis extending through the poles of said magnet, pole pieces carried on said support in contact with said poles, a movable member mounted on said support to vibrate between said pole pieces about an axis intersecting the axis of vibration of said support, and means for vibrating said support in synchronism with said member.

8. In an oscillograph, the combination with a field magnet, of a support mounted to move between the poles of said magnet, pole pieces mounted on said support in engagement with the magnet poles, a movable member mounted on said support to move between said pole pieces in response to current through the oscillograph, and means for vibrating said support in synchronism with said member.

9. In an oscillograph, the combination with a reflecting galvanometer comprising a field magnet, a support pivotally mounted on the pole of said magnet, and a mirror mounted on said support to vibrate about an axis intersecting the axis of the support in response to current through the galvanometer, of a synchronous motor connected to the source of said current to vibrate said support in synchronism with said current.

10. In an oscillograph, the combination with a reflecting galvanometer comprising a field magnet, a support pivotally mounted on a pole of said magnet, and a mirror mounted on said support to vibrate about an axis intersecting the axis of the support in response to current through the galvanometer, of a synchronous motor connected to the source of said current, and a cam on the shaft of said motor connected to said support to vibrate it in synchronism with said current.

11. In an oscillograph, the combination with a reflecting galvanometer having a mirror mounted to vibrate about two intersecting axes, actuating means for rocking the mirror on one axis with a synchronously periodic motion, means for giving the mirror a motion on the other axis varying with a function of the energy to be measured, and means to prevent the reflection of light from said mirror during a definite portion of each vibration.

12. In an oscillograph, the combination with a reflecting galvanometer having a mirror mounted to vibrate about two intersecting axes, of a synchronous motor connected to the circuit of the galvanometer, a cam on the shaft of said motor for vibrating said mirror, and a shutter mounted on the shaft of said motor to prevent the reflection of light from said mirror during a predetermined part of each vibration.

In witness whereof I have hereunto set my hand this 13th day of February, 1908.

JOHN THOS. DEMPSTER.

Witnesses:
BENJAMIN B. HULL,
HELEN ORFORD.